(12) United States Patent
Yuan et al.

(10) Patent No.: US 11,625,819 B2
(45) Date of Patent: Apr. 11, 2023

(54) METHOD AND DEVICE FOR VERIFYING IMAGE AND VIDEO

(71) Applicant: BEIJING DAJIA INTERNET INFORMATION TECHNOLOGY CO., LTD., Beijing (CN)

(72) Inventors: Yong Yuan, Beijing (CN); Yan Li, Beijing (CN); An Liu, Beijing (CN); Jie Yang, Beijing (CN); Bingqing Ke, Beijing (CN); Yanjun Ma, Beijing (CN); Cunyi Zhang, Beijing (CN); Dong Ding, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 17/073,880

(22) Filed: Oct. 19, 2020

(65) Prior Publication Data
US 2021/0118119 A1 Apr. 22, 2021

(30) Foreign Application Priority Data

Oct. 18, 2019 (CN) .......................... 201910996351.5

(51) Int. Cl.
*G06T 7/73* (2017.01)
*G06T 7/00* (2017.01)
*G06V 20/40* (2022.01)

(52) U.S. Cl.
CPC .............. *G06T 7/0002* (2013.01); *G06T 7/74* (2017.01); *G06V 20/46* (2022.01); *G06V 20/48* (2022.01); *G06T 2207/10016* (2013.01)

(58) Field of Classification Search
CPC ......... G06T 2207/10016; G06T 7/0002; G06T 7/74; G06T 1/0028; G06T 2201/0201;
(Continued)

(56) References Cited

U.S. PATENT DOCUMENTS 9,418,297 B2 * 8/2016 Hefeeda ................. G06V 20/48
2010/0098324 A1 * 4/2010 Fujieda ..................... G06T 7/33
382/218

(Continued)

FOREIGN PATENT DOCUMENTS

CN 104156952 A 11/2014
CN 104766084 A 7/2015
(Continued)

OTHER PUBLICATIONS

Zhu, Y., Shen, X. & Chen, H. Copy-move forgery detection based on scaled ORB. Multimed Tools Appl 75, 3221-3233 (2016). https://doi.org/10.1007/s11042-014-2431-2 (Year: 2016).*

(Continued)

*Primary Examiner* — Ian L Lemieux
(74) *Attorney, Agent, or Firm* — Knobbe, Martens, Olson & Bear, LLP

(57) ABSTRACT

A method for verifying an image can include: acquiring a first feature point set of a source image and a second feature point set of a target image; determining a target local feature point pair based on the first feature point set and the second feature point set; determining a mapped point of the first feature point on the target image; determining a distance between a second feature point and the mapped point; acquiring a quantity of reference local feature point pairs; and determining that the target image is an image acquired by copying the source image based on the quantity being greater than a target quantity.

11 Claims, 6 Drawing Sheets

(58) Field of Classification Search
CPC ...... G06V 10/462; G06V 20/40; G06V 20/46; G06V 20/48
See application file for complete search history.

(56) References Cited

U.S. PATENT DOCUMENTS

| | | | |
|---|---|---|---|
| 2013/0208997 | A1 | 8/2013 | Liu |
| 2014/0044361 | A1* | 2/2014 | Lee ............... G06V 10/469 382/201 |
| 2014/0105505 | A1* | 4/2014 | Ioffe ............... G06V 10/464 382/197 |
| 2014/0254940 | A1* | 9/2014 | Shiiyama ......... G06V 10/757 382/201 |
| 2016/0104042 | A1* | 4/2016 | Romanik ............... G06T 7/33 382/103 |
| 2016/0300122 | A1* | 10/2016 | Bao ............... G06V 10/443 |
| 2017/0061231 | A1* | 3/2017 | Higa ............... G06V 10/757 |
| 2018/0315221 | A1* | 11/2018 | Jones ............... G06V 20/64 |
| 2019/0332849 | A1* | 10/2019 | Gupta ............... G06F 16/5838 |
| 2021/0287381 | A1* | 9/2021 | Wang ............... G06T 7/73 |
| 2021/0319250 | A1* | 10/2021 | Chen ............... G06V 10/751 |

FOREIGN PATENT DOCUMENTS

| | | |
|---|---|---|
| CN | 105354558 A | 2/2016 |
| CN | 105354578 A | 2/2016 |
| CN | 105608233 A | 5/2016 |
| CN | 109859225 A | 6/2019 |

OTHER PUBLICATIONS

Rublee et al., "ORB: an efficient alternative to SIFT or SURF", 2011 IEEE International Conference on Computer Vision—8 pages (2011).

Bian et al., "GMS: Grid-based Motion Statistics for Fast, Ultra-robust Feature Correspondence", 2017 IEEE Conference on Computer Vision and Pattern Recognition—10 pages (2017).

China National Intellectual Property Administration, First office action of Chinese application No. 201910996351.5 dated Dec. 27, 2022, which is foreign counterpart application of this US application.

Nan Luo et al., "Pair-wise feature points based matching algorithm for repetitive patterns images," Journal of Image and Graphics, vol. 20, No. 1, Jan. 16, 2015, pp. 113-124.

* cited by examiner

METHOD AND DEVICE FOR VERIFYING IMAGE AND VIDEO

CROSS-REFERENCE TO RELATED APPLICATIONS

This application is based on and claims priority under 35 U.S.C. 119 to Chinese patent application No. 201910996351.5, filed on Oct. 18, 2019, in the China National Intellectual Property Administration, the disclosure of which is herein incorporated by reference in its entirety.

TECHNICAL FIELD

The present disclosure relates to the field of image detection, in particular to methods and devices for verifying an image and a video.

BACKGROUND

With the rapid development of multimedia technologies, more and more images are being published on the Internet. The images in the existing Internet can almost be copied at will without authorization, and then distributed on the Internet after the editing processing such as cropping, text adding, and filtering. However, any image with the same local features as the source image may be determined as a problem image. Although some images have the same local features as the source image, these are actually images shot from different shooting angles, and misjudgment is easily caused.

SUMMARY

Embodiments of the present disclosure provide methods and devices for verifying an image and a video.

According to one aspect of embodiments of the present disclosure, a method for verifying an image is provided. The method includes:

acquiring a first feature point set of a source image and a second feature point set of a target image;

determining a target local feature point pair based on the first feature point set and the second feature point set, wherein the target local feature point pair includes a first feature point in the source image and a second feature point in the target image;

determining a mapped point of the first feature point on the target image;

determining a distance between the second feature point and the mapped point;

acquiring a quantity of reference local feature point pairs, wherein the reference local feature point pairs are target local feature point pairs with distances being less than a target distance threshold; and determining, based on the quantity being greater than a target quantity, that the target image is an image acquired by copying the source image.

According to another aspect of embodiments of the present disclosure, a method for verifying a video is provided. The method includes:

acquiring a plurality of matched image pairs between a source video and a target video, wherein the matched image pair includes a source image in the source video and a target image in the target video;

acquiring a first feature point set of the source image and a second feature point set of the target image in the matched image pair for each of the matched image pairs;

determining a target local feature point pair based on the first feature point set and the second feature point set, wherein the target local feature point pair includes a first feature point in the source image and a second feature point in the target image;

determining a mapped point of the first feature point on the target image;

determining a distance between the second feature point and the mapped point;

acquiring a quantity of reference local feature point pairs, wherein the reference local feature point pairs are target local feature point pairs with distances being less than a target distance threshold;

determining the matched image pairs as target image pairs based on the quantity being greater than a target quantity;

determining a repetition rate of the target video and the source video based on the quantity of the target image pairs and the quantity of images of the target video; and determining, based on the repetition rate being greater than a target value, that the target video is a video acquired by copying the source video.

According to yet another aspect of embodiments of the present disclosure, an electronic device is provided. The electronic device includes: a processor; and one or more memories for storing at least one instruction executable by the processor. The at least one instruction, when executed by the processor, enables the processor to perform a method including:

acquiring a first feature point set of a source image and a second feature point set of a target image;

determining a target local feature point pair based on the first feature point set and the second feature point set, wherein the target local feature point pair includes a first feature point in the source image and a second feature point in the target image;

determining a mapped point of the first feature point on the target image;

determining a distance between the second feature point and the mapped point;

acquiring a quantity of reference local feature point pairs, wherein the reference local feature point pairs are target local feature point pairs with distances being less than a target distance threshold; and determining, based on the quantity being greater than a target quantity, that the target image is an image acquired by copying the source image.

BRIEF DESCRIPTION OF THE DRAWINGS

The accompanying drawings incorporated in the description and forming a part thereof illustrate the embodiments of the present disclosure and are used to explain the principle of the present disclosure along therewith.

DETAILED DESCRIPTION

To enable a person skilled in the art to better understand the embodiments of the present disclosure, the technical solutions in the embodiments of the present disclosure are clearly and completely described below in conjunction with the accompanying drawings.

It should be noted that the terms such as "first" and "second" in the description and claims of the present disclosure and the above accompanying drawings are used to distinguish similar objects, and are not necessarily used to describe a specific sequence or sequence. It should be understood that the data used in this way can be interchanged under appropriate circumstances, such that the embodiments of the present disclosure described herein can be implemented in an order other than those illustrated or described herein. The embodiments set forth in the following description of the embodiments of the present disclosure do not represent all the embodiments consistent with the present disclosure. Instead, these are merely examples of apparatuses and methods consistent with some aspects of the present disclosure as recited in the appended claims.

The user information involved in the present disclosure is the information authorized by the user or fully authorized by all parties.

With the rapid development of multimedia technologies, there are more and more images on the Internet. The images in the existing Internet can almost be copied at will without authorization, and then distributed on the Internet after the editing processing such as cropping, text adding, and filtering. In the related art, for effective protection of the images, the images can be verified. The verification process may include: extracting local features contained in a target image and a source image respectively, and then determining whether the target image is an image acquired by such processing as copying and editing on the source image based on the quantity of the same local features contained in both.

However, during the verification based on the above method, any image with the same local features as the source image may be determined as a problem image. Although some images have the same local features as the source image, they are actually images shot from different shooting angles, and misjudgment is easily caused. That is, the above method has a lower verification accuracy. In order to solve the technical problem, the embodiments of the present disclosure provide a method for verifying an image.

Figure 1:
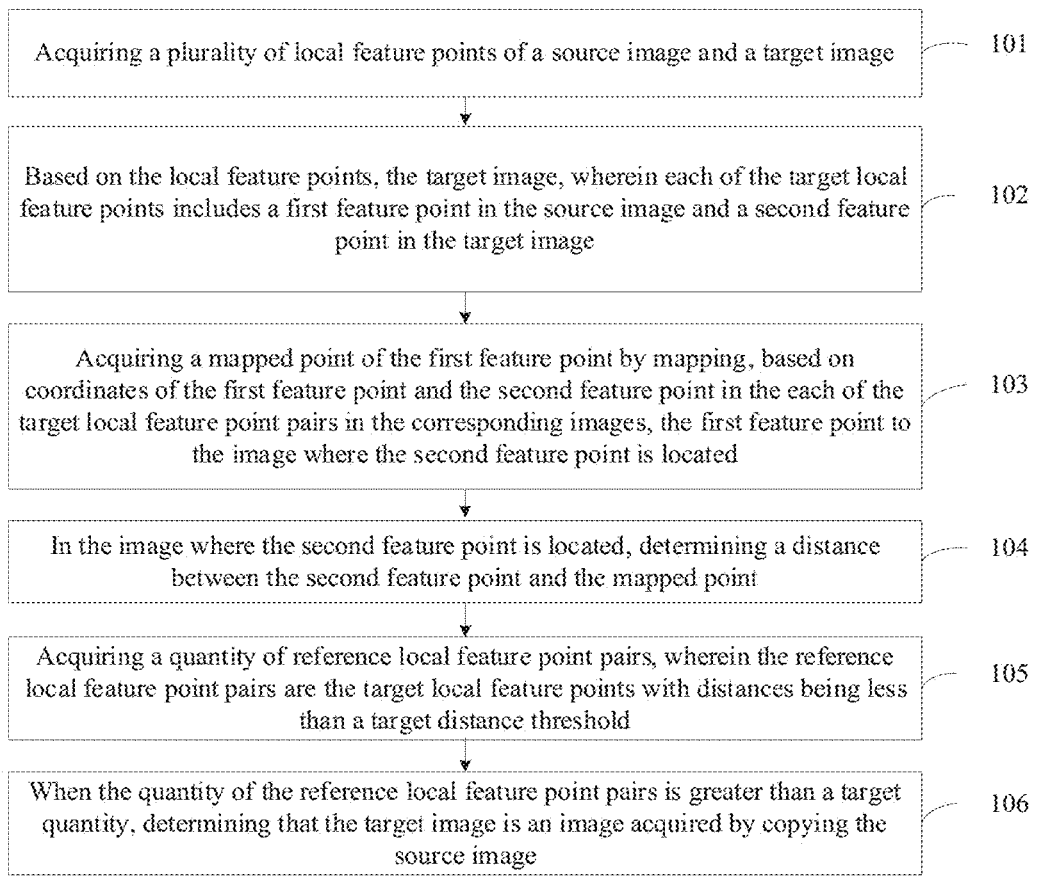
FIG. 1 is a flowchart of a method for verifying an image according to an embodiment of the present disclosure.

FIG. 1 is a flowchart of a method for verifying an image according to an embodiment of the present disclosure. The method may be applicable to an electronic device, such as a terminal or a server. The embodiment of the present disclosure is illustrated with the terminal. As shown in FIG. 1, the method includes the following steps.

In 101, a plurality of local feature points of the source image and the target image are acquired.

In the embodiment of the present disclosure, the source image may be any original image, and the target image may be any image. For example, the target image may be any one of a plurality of images acquired by inputting keywords corresponding to the source image on the Internet. The embodiment of the present disclosure does not limit the way of acquiring the target image. A plurality of local feature points of the source image and the target image may be extracted by using an oriented fast and rotated brief (ORB) local feature point extraction algorithm, a scale invariant feature transform (SIFT) local feature point extraction algorithm or a speed up robust features (SURF) local feature point extraction algorithm. Since the ORB local feature extraction algorithm integrates the fast from accelerated segment test (FAST) feature point detection method with an efficient calculation speed, the embodiment of the present disclosure may use the ORB local feature extraction algorithm to make an extraction rate of the local feature points faster. At the same time, the ORB local feature point extraction algorithm uses a binary robust independent elementary features (BRIEF) local feature point descriptor to form the image features of the local feature points. Since the BRIEF local feature descriptor uses a binary code string as the descriptor, the time for forming the image features of the local feature points is shortened, and meanwhile, an occupancy rate of the image features of the local feature points for a storage space is also reduced.

In some embodiments, a first feature point set of the source image and a second feature point set of the target image are acquired, and the first feature point set and the second feature point set include a plurality of local feature points.

In 102, based on the local feature points, target local feature point pairs which meet a target matching condition in the source image and the target image are acquired, and each target local feature point pair includes a first feature point in the source image and a second feature point in the target image.

In the embodiment of the present disclosure, after a plurality of local feature points of the source image and the target image are acquired, the target local feature point pairs are acquired by matching the image features of the local feature points between the two images. The method of matching the image features based on the local feature points may be based on a distance function to calculate a similarity of the image features corresponding to any two local feature points. The distance function may be a Manhattan Distance function, a Weighted Euclidean Distance function, etc. The embodiment of the present disclosure does not limit the distance function, which can be determined by those skilled in the art according to actual needs. The target matching condition may be that the two local feature points corresponding to the maximum similarity are used as the target local feature point pair, or the two local feature points corresponding to the maximum similarity within a fixed similarity interval are used as the target local feature point pair. The embodiment of the present disclosure does not limit the target matching condition, which can be determined by those skilled in the art according to actual needs.

In some embodiments, the target local feature point pairs are determined based on the first feature point set and the second feature point set.

In 103, a mapped point of the first feature point is acquired by mapping, based on coordinates of the first feature point and the second feature point in the each of the target local feature point pairs in the corresponding images, the first feature point to the image where the second feature point is located.

In the embodiment of the present disclosure, for the target image taken in the same scenario at different shooting angles, the target image may be misjudged as being acquired from the source image, for example, the target image is misjudged as being acquired by editing processing such as rotating after copying the source image. For each pair of target local feature points corresponding to the target image and the source image, the target local feature points include one first feature point and one second feature point. The first feature point may be mapped to the image where the second feature point is located, such that the mapped point of the first feature point is acquired in the image where the second feature point is located, that is, the above mapped point is the mapped point of the first feature point on the target image. The way of mapping the first feature point to the image where the second feature point is located may be affine transformation or homography transformation based on a rigid body transformation matrix and a homography matrix. The embodiment of the present disclosure does not limit the way of mapping the first feature point to the second feature point, which can be determined by those skilled in the art according to actual needs. The embodiment of the present disclosure does not limit the image to which the first feature point belongs. The first feature point of the source image (the first feature point represents the local feature point in the source image) may be mapped to the target image, or the first feature point of the target image (the first feature point represents the local feature point in the target image) may also be mapped to the source image.

In 104, in the image where the second feature point is located, a distance between the second feature point and the mapped point is determined.

In the embodiment of the present disclosure, when the target image is an image shot in the same scenario at different shooting angles, if the first feature point is a feature point in the source image, the first feature point is mapped to the target image. Since the target image is not acquired by copying the source image, the distance from the second feature point in the target image to the mapped point is relatively large. If the target image is acquired by copying the source image, after the mapping transformation, the distance from the second feature point in the target image to the mapped point is relatively small or the second feature point and the mapped point overlap. Therefore, whether the target image is acquired by copying the source image can be determined based on the distance between the second feature point and the mapped point after the mapping operation. The distance between the second feature point and the mapped point may be determined by the Euclidean distance formula or the cosine distance formula. The method for determining the distance is not limited in the embodiment of the present disclosure, which can be determined by those skilled in the art according to actual needs.

In the embodiment of the present disclosure, when the target image is an image shot in the same scenario at different shooting angles, if the first feature point is a feature point in the target image, the first feature point in the target image is mapped to the source image. Since the target image is not acquired by copying the source image, the distance from the second feature point in the source image to the mapped point is relatively large. If the target image is acquired by copying the source image, after the mapping transformation, the distance from the second feature point in the source image to the mapped point is relatively small or the second feature point and the mapped point overlap. Therefore, whether the target image is acquired by copying the source image can be determined based on the distance between the second feature point and the mapped point after the mapping operation. The distance between the second feature point and the mapped point can be determined by the Euclidean distance formula or the cosine distance formula. The method for determining the distance is not limited in the embodiment of the present disclosure, which can be determined by those skilled in the art according to actual needs.

In 105, a quantity of reference local feature point pairs is acquired, wherein the reference local feature point pairs are the target local feature point pairs with distances being less a target distance threshold.

In the embodiment of the present disclosure, based on the distances between the second feature points and the mapped point acquired in the previous step, target local feature point pairs with distances being less than the target distance threshold are acquired. The target distance threshold may be determined according to the adopted mapping transformation method. If the target image with different properties is mapped to the same source image with different mapping transformation methods, then the local feature points in the target image have different mapping positions. Those skilled in the art may separately acquire the target image acquired by copying the source image and the target image not acquired by copying the source image, and use the same mapping transformation method to determine the target distance threshold.

In 106, when the quantity of the reference local feature point pairs is greater than a target quantity, it is determined that the target image is an image acquired by copying the source image.

In the embodiment of the present disclosure, the target quantity may be determined based on the quantity of the local feature points acquired from the target image. For example, when the quantity of the local feature points acquired from the target image is 100, the target quantity may be 50. When the quantity of reference local feature point pairs is greater than 50, it is determined that the target image is acquired by copying the source image. The embodiment of the present disclosure does not limit the target quantity, which can be determined by those skilled in the art according to actual needs.

In the method according to the embodiment of the present disclosure, for the target local feature point pairs acquired by matching a plurality of local feature points of the source image and the target image, the mapped points of the first feature points are acquired by mapping, based on the coordinates of the first feature points and the second feature points in the target local feature point pairs, the first feature points are mapped to the image where the second feature points are located. In the image where the second feature points are located, the distances between the second feature points and the mapped points are determined to acquire the quantity of the reference local feature point pairs. When the quantity of the reference local feature point pairs is greater than the target quantity, the target image is determined to be an image acquired by copying the source image. The mapped points at the same angle as the image where the second feature points are located is acquired by subjecting the first feature points to mapping transformation, and then the distances between the second feature points and the mapped points are determined to acquire the difference in a shooting angle of the source image and the target image.

In some embodiments, step 102 includes:

1021. For any local feature point, distances between the local feature point and a plurality of reference feature points are determined, wherein the reference feature points are local feature points which are not in the same image as the local feature point.

In the embodiment of the present disclosure, for any local feature point, the method for determining the distances between the local feature point and the reference feature points may be through the calculation of the Manhattan Distance function and the Weighted Euclidean Distance function. The embodiment of the present disclosure does not limit the distance function, which can be determined by those skilled in the art according to actual needs.

1022. A first distance and a second distance are acquired, wherein the first distance is a distance between the local feature point and a closest reference feature point, and the second distance is a distance between the local feature point and a second closest reference feature point. When a ratio of the first distance to the second distance is less than a target ratio, the reference feature point corresponding to the first distance and the local feature point are used as a target local feature point pair.

In the embodiment of the present disclosure, the reference feature point which forms the target local feature point pair with the local feature point is determined for any local feature point by determining the ratio of the distance between the local feature point and the closest reference feature point to the distance between the local feature point and the second closest reference feature point. The closest reference feature point is the reference feature point with a closest distance to the local feature point; and the second closest reference feature point is the reference feature point with a second closest distance to the local feature point. For the local feature points in the source image and the target image, the image features of the local feature points have high-dimensional features. In the case of mismatching, many reference feature points corresponding to similar distances may be included, and the ratio of the first distance to the second distance acquired therefrom is larger. Therefore, the accuracy of acquiring the target local feature point pairs can be improved by the way of reducing the ratio. When the ratio of the closest reference feature point and the second closest reference feature point is less than the target ratio, the closest reference feature point and the local feature point form a target local feature point pair. The embodiment of the present disclosure does not limit the target ratio, which can be determined by those skilled in the art according to actual use needs. After the target local feature point pairs are determined by the method that the ratio of the closest reference feature point and the second closest reference feature point is less than the target ratio, grid-based motion statistics (GMS) may be further used to optimize the matching accuracy of the target local feature point pairs, thereby eliminating the wrong target local feature point pairs.

In some embodiments, step 103 includes:

1031. The rigid body transformation matrix is determined according to the coordinates of the first feature point and the second feature point in each target local feature point pair in the corresponding images.

In the embodiment of the present disclosure, when the first feature point is a feature point in the source image, based on the coordinates of the first feature point in the source image and the second feature point in the target image in each target local feature point pair, the rigid body transformation matrix is determined. For a plurality of target local feature point pairs $\{(P_{a1},P_{b1}), (P_{a2},P_{b2}), \ldots, (P_{aK}, P_{bK})\}$, assuming that the coordinates of the local feature points corresponding to the source image are $\{P_{a1}(x_{a1},y_{a1}), P_{a2}(x_{a2},y_{a2}), \ldots, P_{aK}(x_{aK},y_{aK})\}$, and the coordinates of the local feature points corresponding to the target image are $\{P_{b1}(x_{b1},y_{b1}), P_{b2}(x_{b2},y_{b2}), \ldots, P_{bK}(x_{bK},y_{bK})\}$, then the coordinates of the local feature points corresponding to the target image and the coordinates of the local feature points corresponding to the source image have the following transformation relation, namely:

$$Y = H_0 X$$

Y is the coordinates of the local feature points corresponding to the target image, X is the coordinates of the local feature points corresponding to the source image, and $$H_0 = \begin{bmatrix} a & b & c \\ d & e & f \end{bmatrix}$$

is called the rigid body transformation matrix. In the rigid body transformation matrix $H_0$, a, b, c, d, e and f are the 6 degrees of freedom parameters to be solved. The coordinates $P_{ai}(x_{ai},y_{ai})$ and $P_{bi}(x_{bi},y_{bi})$, i=1, 2, ..., k of the local feature points in the target local feature point pairs are brought into the above formula, and the rigid transformation matrix $H_0$ is acquired by the least square method.

1032. Based on the rigid body transformation matrix, the homography matrix for determining the mapped point is acquired.

In the embodiment of the present disclosure, the homography mapping requires the homography matrix to be a 3*3 square matrix, while the image is a two-dimensional image, such that the value of z direction may be regarded as an identity transformation, that is $$z = \begin{bmatrix} 0 & 0 & 1 \end{bmatrix} \begin{bmatrix} x \\ y \\ z \end{bmatrix}.$$

Therefore, the homography matrix H is shown as the following formula:

$$H = \begin{bmatrix} H_0(0,0) & H_0(0,1) & H_0(0,2) \\ H_0(1,0) & H_0(1,1) & H_0(1,2) \\ 0 & 0 & 1 \end{bmatrix}$$

1033. The mapped point of the first feature point is acquired for each of the target feature point pairs by mapping, based on the homography matrix, the first feature point the image where the second feature point is located.

In the embodiment of the present disclosure, for any target local feature point pair $(P_{aj},y_{bj})$ in the source image and the target image, $j \in (1, 2, \ldots, k)$, and $P_{bj}$ is subjected to homography transformation to acquire a mapped point $P'_{bj}$ on the image where $P_{aj}$ is located. Then the mapping transformation loss value $\mathrm{loss}(P_{aj},P_{bj})$ (the mapping transformation loss value represents the distance between the second feature point and the mapped point) of any target local feature point pair in the source image and the target image may be calculated by using the following cosine distance formula:

$$\mathrm{loss}(P_{aj},P_{bj}) = \|P_{aj} - P'_{bj}\|^2$$

Figure 2:
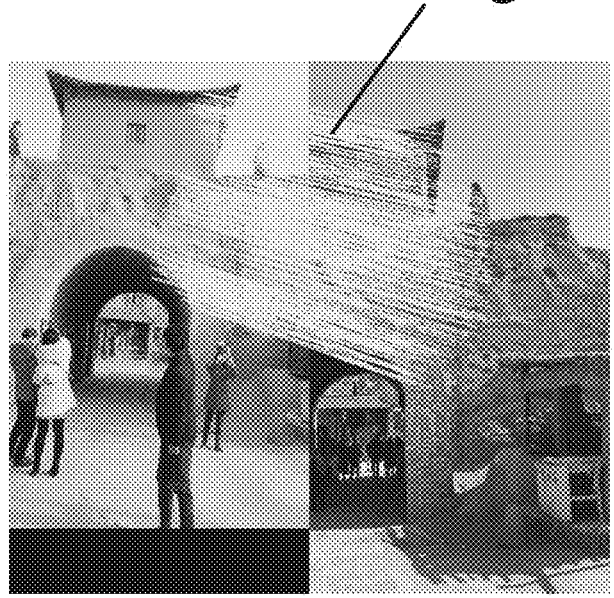
FIG. 2 is a schematic diagram of an application scenario of a method for verifying an image according to an embodiment of the present disclosure.
Figure 3:
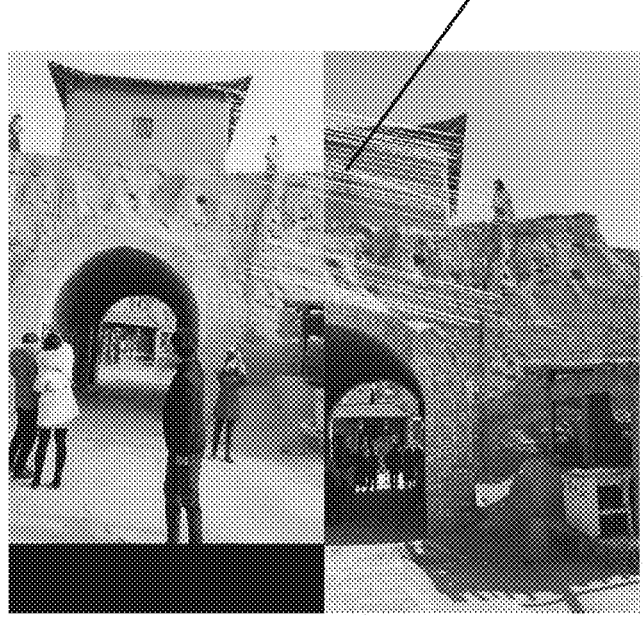
FIG. 3 is a schematic diagram of an application scenario of a method for verifying an image according to an embodiment of the present disclosure.

As shown in FIGS. 2 and 3, the endpoints of the connecting lines in the figures correspond to the target local feature point pairs of the left and right images. FIG. 2 shows the quantity of the target local feature point pairs of the left and right images determined when the left and right images are not subjected to mapping transformation. FIG. 3 shows the quantity of the target local feature point pairs of the left and right two images acquired when the left and right images are subjected to mapping transformation. It can be seen from FIGS. 2 and 3 that after the mapping transformation determination, the quantity of the target local feature point pairs of the two images in the same scenario at different shooting angles is significantly reduced. Assuming that the quantity of the target local feature point pairs in FIG. 2 is 100, and the quantity of the target local feature point pairs in FIG. 3 is 10, when the preset target quantity is 50, for the left and right two images in the same scenario at different shooting angles shown in FIG. 3, since the quantity of the target local feature point pairs is 10, the left and right images in FIG. 3 cannot be determined as one of the images copied from the other image.

In some embodiments, step 105 includes: searching for the local feature points in the source image or the target image based on a target sliding window; and determining the reference local point pairs based on the target local feature point pairs in the target sliding window.

In the embodiment of the present disclosure, when the quantity of the reference local feature point pairs is larger, in order to increase the quantity of the reference local feature point pairs, the target sliding window may be set to search for the local feature points belonging to the reference local feature point pairs in the source image or the target image. After the target local feature point pair corresponding to the local feature points in the target sliding window is recorded as one reference local feature point pair, the quantity of the reference local feature point pairs is acquired.

The size of the target sliding window may be determined based on the size of image pixels. When the image pixels are larger, the target sliding window containing a first quantity of pixels may be set. When the image pixels are smaller, the target sliding window containing a second quantity of pixels may be set. The first quantity of pixels is greater than the second quantity of pixels. The present disclosure does not limit the first quantity of pixels and the second quantity of pixels, and those skilled in the art may select the target sliding window of a corresponding size based on the actual image size. For example, the target sliding window may be set as a circular sliding window with a pixel reduction of 2, and the image is searched based on the target sliding window. The quantity of the reference local feature point pairs in the image is acquired by recording the target local feature point pair corresponding to the local feature points in the target sliding window as a reference local feature point pair until the entire image is traversed.

Figure 4:
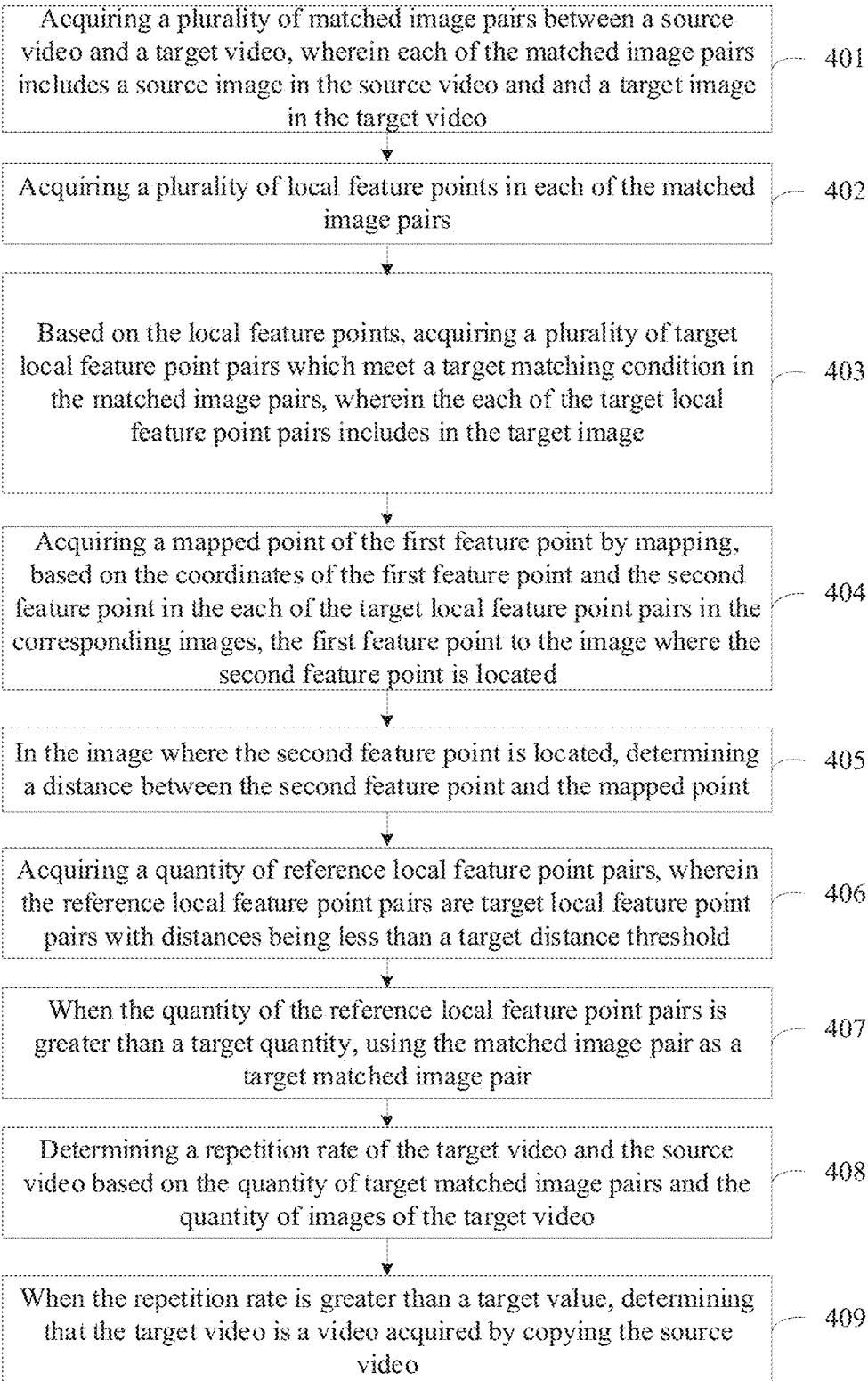
FIG. 4 is a flowchart of a method for verifying a video according to an embodiment of the present disclosure.

FIG. 4 is a flowchart of a method for verifying a video according to an embodiment of the present disclosure. The method may be applicable to an electronic device, such as a terminal or a server. The embodiment of the present disclosure is illustrated with the terminal. As shown in FIG. 4, the method includes the following steps.

In 401, a plurality of matched image pairs between a source video and a target video are acquired, wherein each of the matched image pairs includes a source image in the source video and a target image in the target video.

In the embodiment of the present disclosure, the source video may be any original video, and the target video may be any video among a plurality of videos acquired by inputting keywords corresponding to the source video on the Internet. The embodiment of the present disclosure does not limit the way of acquiring the target video. The way of acquiring a plurality of matched image pairs may include calculating the similarity of the image features of any two images acquired in the source video and the target video respectively, and determining the corresponding matched image pair based on the similarity calculation result; or inputting a plurality of images acquired in the source video and the target video into a pre-trained image matching verification model, and acquiring a plurality of matched image pairs based on an output result of the image matching verification model. The embodiment of the present disclosure does not limit the acquisition of the matched image pairs, wherein one matched image pair includes the source image in one source video and the target image in one target video.

In 402, a plurality of local feature points in each of the matched image pairs are acquired.

In the embodiment of the present disclosure, the specific description of the step refers to the previous embodiment, which is not repeated here.

In 403, based on a plurality of local feature points, target local feature point pairs which meet a target matching condition in the matched image pair are acquired, and each target local feature point pair includes a first feature point in the source image and a second feature point in the target image.

In the embodiment of the present disclosure, the specific description of the step refers to the previous embodiment, which is not repeated here.

In 404, a mapped point of the first feature point is acquired by mapping, based on the coordinates of the first feature point and the second feature point in the each of the target local feature point pairs in the corresponding images, the first feature point to the image where the second feature point is located.

In the embodiment of the present disclosure, the specific description of the step refers to the previous embodiment, which is not repeated here.

In 405, in the image where the second feature point is located, a distance between the second feature point and the mapped point is determined.

In the embodiment of the present disclosure, the specific description of the step refers to the previous embodiment, which is not repeated here.

In 406, a quantity of reference local feature point pairs is acquired, wherein the reference local feature point pairs are the target local feature point pairs with distances being less than a target distance threshold.

In the embodiment of the present disclosure, the specific description of the step refers to the previous embodiment, which is not repeated here.

In 407, when the quantity of the reference local feature point pairs is greater than a target quantity, the matched image pair is determined as the target image pair.

In the embodiment of the present disclosure, the image belonging to the target video represented by the target image pair is acquired by copying the image belonging to the source video. The specific description of the step refers to the previous embodiment, which is not repeated here.

In 408, a repetition rate of the target video and the source video is determined based on the quantity of target image pairs and the quantity of images of the target video.

In the embodiment of the present disclosure, the repetition rate of the target video and the source video may be the ratio of the quantity of target image pairs to the quantity of images of the target video; or a difference between the quantity of target image pairs and the quantity of images of the target video. The embodiment of the present disclosure does not limit the way of determining the repetition rate, which can be determined by those skilled in the art according to actual needs.

In 409, when the repetition rate is greater than a target value, it is determined that the target video is a video acquired by copying the source video.

In the embodiment of the present disclosure, when the repetition rate is the ratio of the quantity of target image pairs to the quantity of images of the target video, the target value may be set to 50%. If the ratio of the quantity of target image pairs to the quantity of images of the target video is greater than the target value, it can be determined that the target video is acquired by copying the source video. When the repetition rate is the difference between the quantity of target image pairs and the quantity of images of the target video, the target value can be determined based on the quantity of images of the target video. For example, when the quantity of images of the target video is 100 images, the target value may be set to 30. When the difference between the quantity of target image pairs and the quantity of images of the target video is less than 30, it is determined that the target video is a video acquired by copying the source video. The embodiment of the present disclosure does not limit the target value, and those skilled in the art can select the corresponding target value according to the way of determining the repetition rate.

In some embodiments, step 401 includes:

4011. The image features of the images in the source video and the target video are acquired.

In the embodiment of the present disclosure, in the source video and the target video, the way of acquiring a plurality of images may include setting a preset quantity, and acquiring the preset quantity of images in the source video and the target video respectively. The way of acquiring the preset quantity of images may be random extraction or interval extraction.

Acquiring the images may also include presetting a quantity of intervals and extracting the images in the source video and the target video based on the preset quantity of intervals respectively. The quantity of images in the source video and the target video acquired in such a way may be the same or different. In some embodiments, a smaller preset quantity of intervals may be set to evenly extract the images from the source video and the target video. The embodiment of the present disclosure does not limit the way of acquiring the images, which can be determined by those skilled in the art according to actual use needs.

4012. In the images, the similarity between any image in the source video and each image in the target video is determined based on the image features, and two images that meet the similarity requirement are used as a matched image pair.

In the embodiment of the present disclosure, the way of determining the matched image pair between the source video and the target video may include using a Euclidean distance or cosine similarity to determine the similarity between the two images based on the image features of any two images, and using two images meeting the similarity requirement as a matched image pair. That is, based on the image features of the images, the similarity between the image belonging to the source video and the image belonging to the target video is determined, and the two images meeting the similarity requirement are regarded as a matched image pair. The embodiment of the present disclosure does not limit the way of determining the similarity of two images, which can be determined by those skilled in the art according to actual needs.

When the cosine similarity is used to determine the similarity between any image in the source video and each image in the target video, in order to increase the rate of determining the matched image pair, the image features of the images may be normalized at first. Assuming that the image features of M images acquired from the source video $F_A$ are normalized to acquire $F_A=\{f_{a1}, f_{a2}, f_{a3}, \ldots, f_{aM}\}$; the image features of N images acquired from the video $F_B$ to be detected are normalized to acquire $F_B=\{f_{b1}, f_{b2}, f_{b3}, \ldots, f_{bN}\}$, then the similarity($f_{ai}, f_{bi}$) between the image features $f_{ai}$ and $f_{bi}$ of any two images of the source video and the target video may be determined according to the following formula:

$$\text{similarity}(f_{ai}, f_{bi}) = \cos\theta = <f_{ai}, f_{bi}>$$

$<f_{ai}, f_{bi}>$ is to perform inner product operation on the image features $f_{ai}$ and $f_{bi}$.

Through the above formula, the cosine similarity calculation may be performed on any two images in the source video and the target video to determine the matched image pair. In the actual application process, the cosine similarity calculation in the form of a matrix can increase the rate of acquiring the matched image pair. Therefore, the image features of the source video and the target video can be formed into the matrix, and the above cosine similarity calculation process for any two images in the source video and the target video is transformed into the cosine similarity calculation for all images in the source video and the target video in a matrix form at the same time to acquire the similarity matrix between the source video $F_A$ and the video $F_B$ to be detected.

After the similarity matrix is acquired, two images meeting the similarity requirement may be selected as a matched image pair in each row of the similarity matrix. The two images meeting the similarity requirement may be the two images corresponding to the maximum similarity, or may be two images with the similarity within a target interval. The embodiment of the present disclosure does not limit the target interval, which can be determined by those skilled in the art according to actual needs. The embodiment of the present disclosure does not limit the similarity requirement, which can be determined by those skilled in the art according to actual needs.

In some embodiments, before step 401, the method further includes: extracting, based on an image feature extraction model, the image features of each image in the source video and the target video; and storing the image features of each image.

In the embodiment of the present disclosure, when the target video is acquired, the image feature extraction model may be used to extract the image features of the images in the source video and the images in the target video in advance, and the image features of the source video and the target video are stored. In order to avoid pre-storing a large quantity of image features and occupying a terminal memory, the image feature extraction model may be a low-dimensional convolutional neural network model to extract low-dimensional image features.

In some embodiments, the image features include global image features with dimensions being less than a target dimension value.

Figure 5:
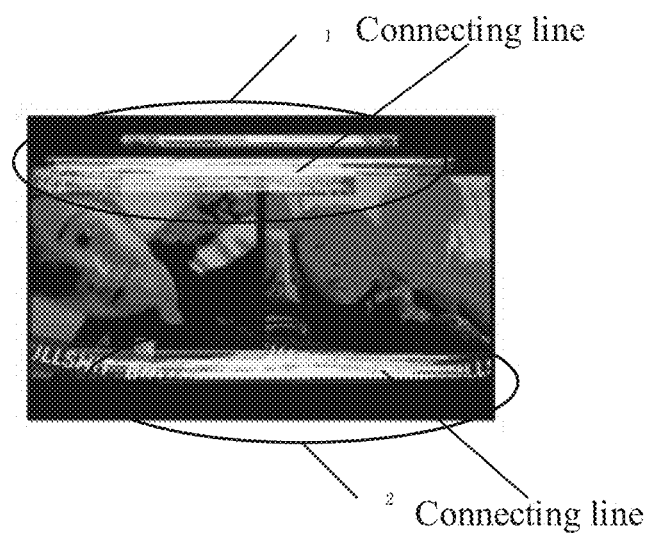
FIG. 5 is a schematic diagram of an application scenario of a method for verifying a video according to an embodiment of the present disclosure.
Figure 6:
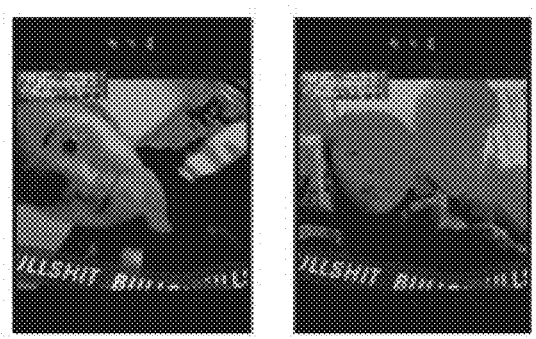
FIG. 6 is a schematic diagram of an application scenario of a method for verifying a video according to an embodiment of the present disclosure.

In the embodiment of the present disclosure, the global image features of the image may include color features, texture features, or shape features of the image. When the acquired image has more global image features (that is, the global image features have a larger dimension), the complexity of matching the global image features is increased, such that the global image features with the dimensions being less than the target dimension value can be selected. The embodiment of the present disclosure does not limit the target dimension value, which can be determined by those skilled in the art according to actual needs. When the image feature extraction model extracts the local image features of the images, as shown in FIG. 5, the endpoints of the connecting lines contained in image region 1 and image region 2 are the local feature points which are extracted from the left and right images and meet the target conditions. The left and right images in FIG. 5 are completely different, except that the image edges of the left and right images contain a plurality of similar local feature points. Therefore, if the image feature extraction model extracts the local image features of the images, when image matching is performed based on the local image features of the images, it is easy to use the images with the same local image region but completely different image content as a matched image pair. When the image feature extraction model extracts the global image features of the images, as shown in FIG. 6, it can be seen that based on the global image features of the images, similar global image features are not acquired in the left and right images. Meanwhile, in the verification process of using the global image features for the target video and the source video, when the contents of the two images differ greatly, the corresponding global image features may also differ greatly, thereby reducing the similarity $(f_{ai}, f_{bi})$ of the two images.

Figure 7:
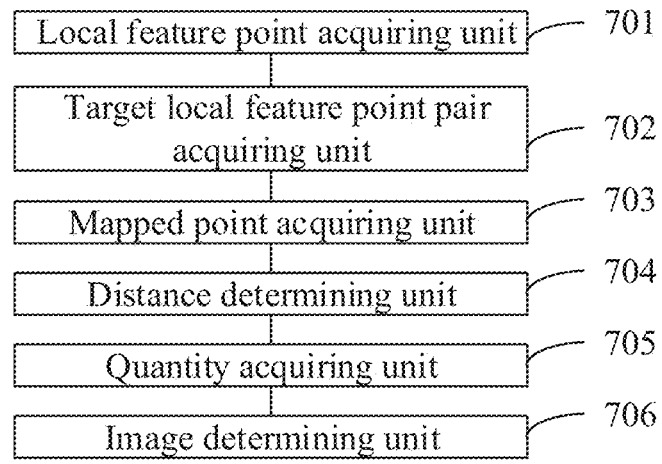
FIG. 7 is a block diagram of an apparatus for verifying an image according to an embodiment of the present disclosure.

FIG. 7 shows a system for verifying an image according to an embodiment of the present disclosure. With reference to FIG. 7, the system includes: a processor configured to implement the functions of six units, i.e., a local feature point acquiring unit 701, a target local feature point pair acquiring unit 702, a mapped point acquiring unit 703, a distance determining unit 704, a quantity acquiring unit 705, and an image determining unit 706.

The local feature point acquiring unit 701 is configured to acquire a plurality of local feature points of a source image and a target image.

The target local feature point pair acquiring unit 702 is configured to acquire a plurality of target local feature point pairs meeting target matching conditions from the local feature points of the source image and the target image, wherein each of the target local feature point pairs includes a first feature point in the source image and a second feature point in the target image.

The mapped point acquiring unit 703 is configured to acquire a mapped point of the first feature point by mapping, based on coordinates of the first feature point and the second feature point in the each of the target local feature point pairs in the corresponding images, the first feature point to the image where the second feature point is located.

The distance determining unit 704 is configured to determine a distance between the second feature point and the mapped point of the first feature point in each pair of target local feature points.

The quantity acquiring unit 705 is configured to acquire a quantity of reference local feature point pairs, wherein the reference local feature point pairs are target local feature point pairs with distances being less than a target distance threshold.

The image determining unit 706 is configured to determine that the target image is an image acquired by copying the source image when the quantity of reference local feature point pairs in the target local feature point pairs is greater than a target quantity.

In some embodiments, the target local feature point pair acquiring unit 702 is configured to, for any local feature point, determine distances between the local feature point and a plurality of reference feature points, wherein the reference feature points are local feature points not in the same image as the local feature point; acquire a first distance and a second distance, wherein the first distance is a distance between the local feature point and a closest reference feature point, and the second distance is a distance between the local feature point and a second closest reference feature point; and use the reference feature point corresponding to the first distance and the local feature point as a target local feature point pair when a ratio of the first distance to the second distance is less than a target ratio.

In some embodiments, the mapped point acquiring unit 703 is configured to determine a rigid body transformation matrix based on the coordinates of the first feature point in the source image and the second feature point in the target image in each target local feature point pair; acquire a homography matrix used to determine the mapped point based on the rigid body transformation matrix; acquire the mapped point of the first feature point by mapping, based on the homography matrix, the first feature point to the image where the second feature point is located; and determine a distance between the second feature point and the mapped point.

In some embodiments, the quantity acquiring unit 705 is configured to search for the local feature points in the source image or the target image based on a target sliding window; and determine the reference local point pairs based on the target local feature point pairs in the target sliding window.

Figure 8:
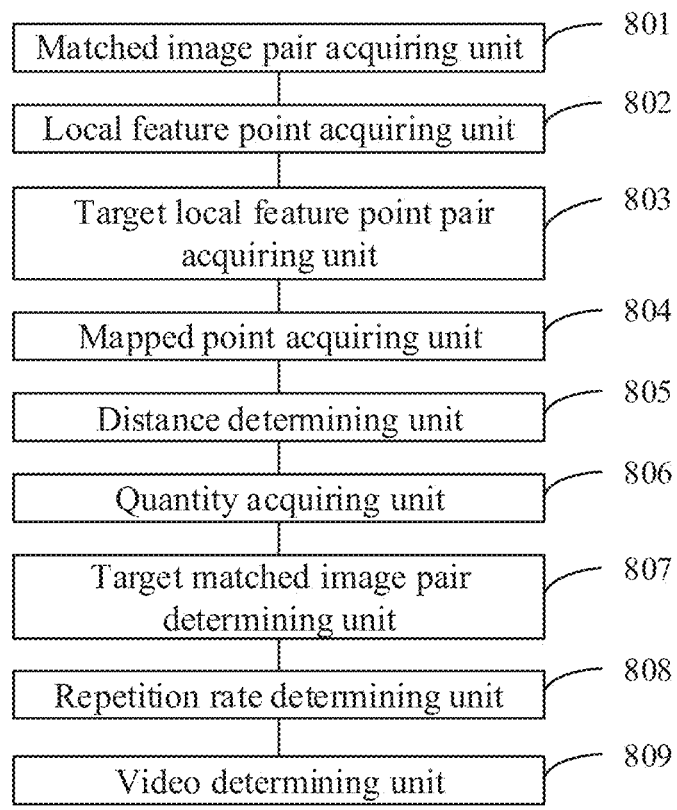
FIG. 8 is a block diagram of an apparatus for verifying a video according to an embodiment of the present disclosure.

FIG. 8 shows system for verifying a video according to an embodiment of the present disclosure. Referring to FIG. 8, the system includes a processor configured to implement the functions of nine units, i.e., a matched image pair acquiring unit 801, a local feature point acquiring unit 802, a target local feature point pair acquiring unit 803, a mapped point acquiring unit 804, a distance determining unit 805, a quantity acquiring unit 806, a target image pair determining unit 807, a repetition rate determining unit 808, and a video determining unit 809.

The matched image pair acquiring unit 801 is configured to acquire a plurality of matched image pairs between a source video and a target video, wherein each of the matched image pairs includes a source image in the source video and a target image in the target video.

The local feature point acquiring unit 802 is configured to acquire a plurality of local feature points in each of the matched image pairs.

The target local feature point pair acquiring unit 803 is configured to acquire a plurality of target local feature point pairs meeting target conditions from the local feature points in each of the matched image pairs, wherein each of the target local feature point pairs includes a first feature point in the source image and a second feature point in the target image.

The mapped point acquiring unit 804 is configured to, for each target local feature point pair, acquire a mapped point of the first feature point by mapping, based on the coordinates of the first feature point and the second feature point in the each of the target local feature point pairs in the corresponding images, the first feature point to the image where the second feature point is located.

The distance determining unit 805 is configured to determine a distance between the second feature point and the mapped point of the first feature point in each target local feature point pair, wherein the mapped point is a mapped point of the first feature point on the target image where the second feature point is located.

The quantity acquiring unit 806 is configured to acquire a quantity of reference local feature point pairs, wherein the reference local feature point pairs are target local feature point pairs with distances being less than a target distance threshold.

The target image pair determining unit 807 is configured to, when the quantity of reference local feature point pairs in the target local feature point pairs is greater than a target quantity, use the matched image pair as the target image pair.

The repetition rate determining unit 808 is configured to determine a repetition rate of the target video and the source video based on the quantity of the target image pairs and the quantity of images of the target video.

The video determining unit 809 is configured to determine that the target video is a video acquired by copying the source video when the repetition rate is greater than a target value.

In some embodiments of the present disclosure, the matched image pair acquiring unit 801 is configured to acquire image features of the images in the source video and the target video; based on the image features of the images, determine a similarity between the image belonging to the source video and the image belonging to the target video respectively, and use the two images meeting the similarity requirement as a matched image pair.

In some embodiments, the matched image pair acquiring unit 801 is further configured to extract, based on an image feature extraction model, the image features of each image in the source video and the target video; and store the image features of each image.

In some embodiments, the image features include global image features with dimensions being less than a target dimension value.

Regarding the apparatus in the above embodiments, the specific way that respective units perform operations has been described in detail in the embodiment of the method, and detailed description is not given here.

Figure 9:
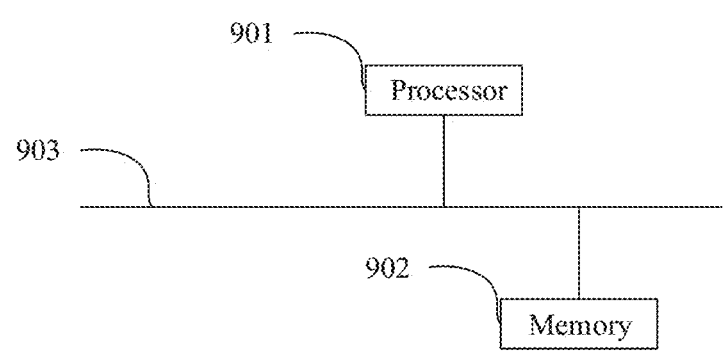
FIG. 9 is a block diagram of an electronic device according to an embodiment of the present disclosure.

Based on the same concept, an embodiment of the present disclosure also provides an electronic device. As shown in FIG. 9, the device includes:

a processor 901; and one or more memories 902 for storing at least one instruction executable by the processor 901.

The at least one instruction, when executed by the processor 901, enables the processor 901 to:

acquire a first feature point set of a source image and a second feature point set of a target image;

determine a target local feature point pair based on the first feature point set and the second feature point set, wherein the target local feature point pair includes a first feature point in the source image and a second feature point in the target image;

determine a mapped point of the first feature point on the target image;

determine a distance between the second feature point and the mapped point;

acquire a quantity of reference local feature point pairs, wherein the reference local feature point pairs are target local feature point pairs with distances being less than a target distance threshold; and determine, based on the quantity greater than a target quantity, that the target image is an image acquired by copying the source image.

The processor 901 and the memory 902 are connected by a communication bus 903.

In some embodiments of the present disclosure, the at least one instruction, when executed by the processor 901, enables the processor 901 to:

determine distances between any local feature point in the first feature point set and a plurality of reference feature points, wherein the reference feature points are local feature points in the second feature point set;

acquire a first distance and a second distance, wherein the first distance is a distance between the local feature point and a closest reference feature point, and the second distance is a distance between the local feature point and a second closest reference feature point; and determine, based on a ratio of the first distance to the second distance being less than a target ratio, the reference feature point corresponding to the first distance and the local feature point as the target local feature point pair.

In some embodiments, the at least one instruction, when executed by the processor 901, enables the processor 901 to:

determine a rigid body transformation matrix based on coordinates of the first feature point in the source image and coordinates of the second feature point in the target image;

acquire a homography matrix based on the rigid body transformation matrix; and determine, based on the homography matrix, the mapped point formed by mapping the first feature point to the target image.

In some embodiments, the at least one instruction, when executed by the processor 901, enables the processor 901 to:

search for the local feature points in the source image or the target image based on a target sliding window;

determine the reference local point pairs based on the target local feature point pairs in the target sliding window; and count the quantity of the reference local feature point pairs.

An embodiment of the present disclosure provides an electronic device. As shown in FIG. 9, the device includes:

a processor 901; and one or more memories 902 for storing at least one instruction executable by the processor 901.

The at least one instruction, when executed by the processor 901, enables the processor 901 to:

acquire a plurality of matched image pairs between a source video and a target video, wherein the matched image pair includes a source image in the source video and a target image in the target video;

acquire a first feature point set of the source image and a second feature point set of the target image in the matched image pair for each of the matched image pairs;

determine target local feature point pairs based on the first feature point set and the second feature point set, wherein the target local feature point pair includes a first feature point in the source image and a second feature point in the target image;

determine a mapped point of the first feature point on the target image;

determine a distance between the second feature point and the mapped point;

acquire a quantity of reference local feature point pairs, wherein the reference local feature point pairs are target local feature point pairs with distances being less than a target distance threshold;

determine the matched image pairs as target image pairs based on the quantity greater than a target quantity;

determine a repetition rate of the target video and the source video based on the quantity of the target image pairs and the quantity of images of the target video; and determine, based on the repetition rate being greater than a target value, that the target video is a video acquired by copying the source video.

The processor 901 and the memory 902 are connected by a communication bus 903.

In some embodiments, the at least one instruction, when executed by the processor 901, enables the processor 901 to:

acquire image features of the images in the source video and the target video;

respectively determine a similarity between the image belonging to the source video and the image belonging to the target video based on the image features of the images; and determine the two images meeting the similarity requirement as a matched image pair.

In some embodiments, the at least one instruction, when executed by the processor 901, enables the processor 901 to:

extract, based on an image feature extraction model, the image features of each image in the source video and the target video; and store the image features of each image.

In some embodiments, the image features include global image features with dimensions being less than a target dimension value.

It should be understood that the foregoing processor may be a central processing unit (CPU), or other general-purpose processors such as a digital signal processor (DSP), an application specific integrated circuit (ASIC), a field-programmable gate array (FPGA) or other programmable logic devices, discrete gates or transistor logic devices, discrete hardware components, etc. The general-purpose processor may be a microprocessor or any conventional processor. It is worth noting that the processor may be a processor that supports an advanced RISC machines (ARM) architecture.

Further, in an optional embodiment, the above memory may include a read-only memory and a random-access memory, and provide instructions and data to the processor. The memory may also include a non-volatile random-access memory. For example, the memory may also store the information of device type.

The memory may be a volatile memory or a non-volatile memory, or may include both the volatile memory and non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), which is used as an external high-speed cache. By way of an example but not limiting illustration, many forms of RAMs, such as a static RAM (SRAM), a dynamic random-access memory (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM), are available.

The present disclosure provides a computer program. When the computer program is executed by a computer, the processor or computer is enabled to execute the corresponding respective steps and/or processes in the above method embodiment.

The above embodiments may be implemented in whole or in part by software, hardware, firmware, or any combination thereof. When implemented by the software, the embodiments may be implemented in the form of a computer program product in whole or in part. The computer program product includes one or more computer instructions. When the computer program instructions are loaded and executed on the computer, the procedures or functions described in the present disclosure are generated in whole or in part. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website, computer, server or data center via a wired (such as a coaxial cable, an optical fiber and a digital subscriber line) fashion or a wireless (such as infrared, wireless and microwave) fashion. The computer-readable storage medium may be any available medium that can be accessed by the computer or a data storage device such as a server or data center integrated with one or more available mediums. The available medium may be a magnetic medium (such as a floppy disk, a hard disk, and a magnetic tape), an optical medium (for example, a DVD), or a semiconductor medium (for example, a solid-state disk), or the like.

Those skilled in the art would easily derive other embodiments of the present disclosure after considering the description and practicing the present disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are regarded as examples, and the scope and spirit of the present disclosure are defined by the appended claims.

It should be understood that the present disclosure is not limited to the precise structures described above and shown in the drawings, and various modifications and changes can be made without departing from its scope. The scope of the present disclosure is defined only by the appended claims.

What is claimed is:

1. A method for verifying an image, comprising:

acquiring a first feature point set of a source image and a second feature point set of a target image;

determining a target local feature point pair based on the first feature point set and the second feature point set, wherein the target local feature point pair comprises a first feature point in the source image and a second feature point in the target image;

determining a mapped point of the first feature point on the target image;

determining a distance between the second feature point and the mapped point;

acquiring a quantity of reference local feature point pairs, wherein the reference local feature point pairs are target local feature point pairs with distances being less than a target distance threshold; and determining that the target image is an image acquired by copying the source image based on the quantity being greater than a target quantity, wherein said determining the mapped point of the first feature point on the target image comprises:

determining a rigid body transformation matrix based on coordinates of the first feature point in the source image and coordinates of the second feature point in the target image;

acquiring a homography matrix based on the rigid body transformation matrix; and determining the mapped point based on the homography matrix, wherein the mapped point is formed by mapping the first feature point to the target image.

2. The method according to claim 1, wherein said determining the target feature point pair based on the first feature point set and the second feature point set comprises:
- determining distances between any local feature point in the first feature point set and a plurality of reference feature points, wherein the reference feature points are local feature points in the second feature point set;
- acquiring a first distance and a second distance, wherein the first distance is a distance between the local feature point and a closest reference feature point, and the second distance is a distance between the local feature point and a second closest reference feature point; and
- determining, based on a ratio of the first distance to the second distance being less than a target ratio, the reference feature point corresponding to the first distance and the local feature point as the target local feature point pair.

3. The method according to claim 1, wherein said acquiring the quantity of the reference local feature point pairs comprises:
- searching for local feature points in the source image or the target image based on a target sliding window;
- determining the reference local feature point pairs based on the target local feature point pairs in the target sliding window; and
- counting the quantity of the reference local feature point pairs.

4. A method for verifying a video, comprising:
- acquiring a plurality of matched image pairs between a source video and a target video, wherein each of matched image pairs comprises a source image in the source video and a target image in the target video;
- acquiring a first feature point set of the source image and a second feature point set of the target image in the each of the matched image pairs;
- determining a target local feature point pair based on the first feature point set and the second feature point set, wherein the target local feature point pair comprises a first feature point in the source image and a second feature point in the target image;
- determining a mapped point of the first feature point on the target image;
- determining a distance between the second feature point and the mapped point;
- acquiring a quantity of reference local feature point pairs, wherein the reference local feature point pairs are target local feature point pairs with distances being less than a target distance threshold;
- determining the matched image pair as a target image pair based on the quantity being greater than a target quantity;
- determining a repetition rate of the target video and the source video based on the quantity of the target image pairs and the quantity of images of the target video; and
- determining, based on the repetition rate greater than a target value, that the target video is as a video acquired by copying the source video.

5. The method according to claim 4, wherein said acquiring the matched image pairs between the source video and the target video comprises:
- acquiring image features of the images in the source video and the target video;
- determining, based on the image features of the images, a similarity between the image belonging to the source video and the image belonging to the target video; and
- determining the two images meeting a similarity requirement as a matched image pair.

6. The method according to claim 5, wherein before said acquiring the image features of the images in the source video and the target video, the method further comprises:
- extracting, based on an image feature extraction model, the image features of each of the images in the source video and the target video; and
- storing the image features of the each of the images.

7. The method according to claim 6, wherein the image features comprise a global image feature with a dimension being less than a target dimension value.

8. The method according to claim 5, wherein the image features comprise a global image feature with a dimension being less than a target dimension value.

9. An electronic device, comprising:
- a processor; and
- one or more memories for storing at least one instruction executable by the processor;
- wherein the at least one instruction, when executed by the processor, causes the processor to perform a method comprising:
  - acquiring a first feature point set of a source image and a second feature point set of a target image;
  - determining a target local feature point pair based on the first feature point set and the second feature point set, wherein the target local feature point pair comprises a first feature point in the source image and a second feature point in the target image;
  - determining a mapped point of the first feature point on the target image;
  - determining a distance between the second feature point and the mapped point;
  - acquiring a quantity of reference local feature point pairs, wherein the reference local feature point pairs are target local feature point pairs with distances being less than a target distance threshold; and
  - determining, based on the quantity being greater than a target quantity, that the target image is an image acquired by copying the source image,
- wherein said determining the mapped point of the first feature point on the target image comprises:
  - determining a rigid body transformation matrix based on coordinates of the first feature point in the source image and coordinates of the second feature point in the target image;
  - acquiring a homography matrix based on the rigid body transformation matrix; and
  - determining the mapped point based on the homography matrix, wherein the mapped point is formed by mapping the first feature point to the target image.

10. The electronic device according to claim 9, wherein said determining the target feature point pair based on the first feature point set and the second feature point set comprises:
- determining distances between any local feature point in the first feature point set and a plurality of reference feature points, wherein the reference feature points are local feature points in the second feature point set;
- acquiring a first distance and a second distance, wherein the first distance is a distance between the local feature point and a closest reference feature point, and the second distance is a distance between the local feature point and a second closest reference feature point; and
- determining, based on a ratio of the first distance to the second distance being less than a target ratio, the reference feature point corresponding to the first distance and the local feature point as the target local feature point pair.

11. The electronic device according to claim 9, wherein said acquiring the quantity of the reference local feature point pairs comprises:
- searching for local feature points in the source image or the target image based on a target sliding window;
- determining the reference local feature point pairs based on the target local feature point pairs in the target sliding window; and
- counting the quantity of the reference local feature point pairs.

* * * * *